(12) United States Patent
Chen et al.

(10) Patent No.: US 12,216,494 B2
(45) Date of Patent: *Feb. 4, 2025

(54) PORTABLE ELECTRONIC DEVICE HAVING BIAXIAL HINGE STRUCTURE

(71) Applicant: Acer Incorporated, New Taipei (TW)

(72) Inventors: Chia-Bo Chen, New Taipei (TW); Yi-Hsuan Yang, New Taipei (TW); Hung-Chi Chen, New Taipei (TW); Wu-Chen Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,038

(22) Filed: Nov. 3, 2023

(65) Prior Publication Data
US 2024/0069594 A1 Feb. 29, 2024

Related U.S. Application Data

(63) Continuation of application No. 17/824,921, filed on May 26, 2022, now Pat. No. 11,846,987.

(30) Foreign Application Priority Data

Dec. 21, 2021 (TW) .................................. 110147986

(51) Int. Cl.
*G06F 1/16* (2006.01)

(52) U.S. Cl.
CPC ............ *G06F 1/1618* (2013.01); *G06F 1/166* (2013.01); *G06F 1/1681* (2013.01)

(58) Field of Classification Search
CPC ....... G06F 1/1618; G06F 1/166; G06F 1/1681
See application file for complete search history.

(56) References Cited

U.S. PATENT DOCUMENTS 5,168,426 A * 12/1992 Hoving ................. G06F 1/1681
361/728
2022/0162892 A1* 5/2022 Mitsui ................... E05F 1/1083

* cited by examiner

*Primary Examiner* — James Wu
(74) *Attorney, Agent, or Firm* — JCIPRNET

(57) ABSTRACT

A portable electronic device including a first body, a second body, a stand, and a hinge structure is provided. The stand has a first pivot part and a second pivot part opposite to the first pivot part, wherein the first pivot part is pivotally connected to the first body, and the second body is pivotally connected to the second pivot part. The hinge structure includes a first bracket secured to the second body, a second bracket secured to the second pivot part of the stand, a first movable base, a first shaft secured to the first bracket and pivoted to the first movable base, a second movable base, a second shaft secured to the first movable base and pivoted to the second movable base, and a sliding shaft fixed to the second movable base and slidably connected to the second bracket.

11 Claims, 6 Drawing Sheets

PORTABLE ELECTRONIC DEVICE HAVING BIAXIAL HINGE STRUCTURE

CROSS-REFERENCE TO RELATED APPLICATION

This application is a continuation application of and claims the priority benefit of U.S. application Ser. No. 17/824,921, filed on May 26, 2022, now allowed, which claims the priority benefit of Taiwan application serial no. 110147986, filed on Dec. 21, 2021. The entirety of each of the above-mentioned patent applications is hereby incorporated by reference herein and made a part of this specification.

BACKGROUND

Technical Field

The disclosure relates to an electronic device, and in particular to a portable electronic device.

Description of Related Art

Due to the characteristics of portability, multitasking and excellent computing performance, notebook computers have become an indispensable tool for modern people. In detail, the notebook computer is composed of a host and a display pivotally connected to each other, and the display can only be turned over around a single axis relative to the host, so the viewing angle and the operating angle are relatively limited. Accordingly, a design in which the display is pivotally connected to the host through a stand is proposed, so that the user can flexibly adjust the viewing angle, operation angle or operation height of the display.

Generally speaking, a single-axis hinge is integrated at the pivot point between the display and the stand, so that the display can be turned over relative to the stand, but the range of the angle that the display can be turned over is too small, which lacks flexibility in operation.

SUMMARY

The present application provides a portable electronic device, which helps to improve the flexibility in operation.

A portable electronic device including a first body, a second body, a stand, and a hinge structure is provided. The stand has a first pivot part and a second pivot part opposite to the first pivot part, wherein the first pivot part is pivotally connected to the first body, and the second body is pivotally connected to the second pivot part. The hinge structure includes a first bracket secured to the second body, a second bracket secured to the second pivot part of the stand, a first movable base, a first shaft secured to the first bracket and pivoted to the first movable base, a second movable base, a second shaft secured to the first movable base and pivoted to the second movable base, and a sliding shaft fixed to the second movable base and slidably connected to the second bracket.

Based on the above, in the portable electronic device of the present application, the second body is pivotally connected to the stand through the biaxial hinge structure. Therefore, the second body can be turned over relative to the stand through the two shafts in sequence, so as to increase the range of the angle that can be turned, thereby improving the flexibility in operation. On the other hand, when the second body is turned over relative to the stand through one of the two shafts, the second body can slide relative to the stand to improve the smoothness of the second body and avoid collision with the stand when the second body is turned over.

In order to make the above-mentioned features and advantages of the present application more obvious and easier to understand, the following specific examples are given, and are described in detail as follows in conjunction with the accompanying drawings.

DESCRIPTION OF THE EMBODIMENTS

Figure 1A:
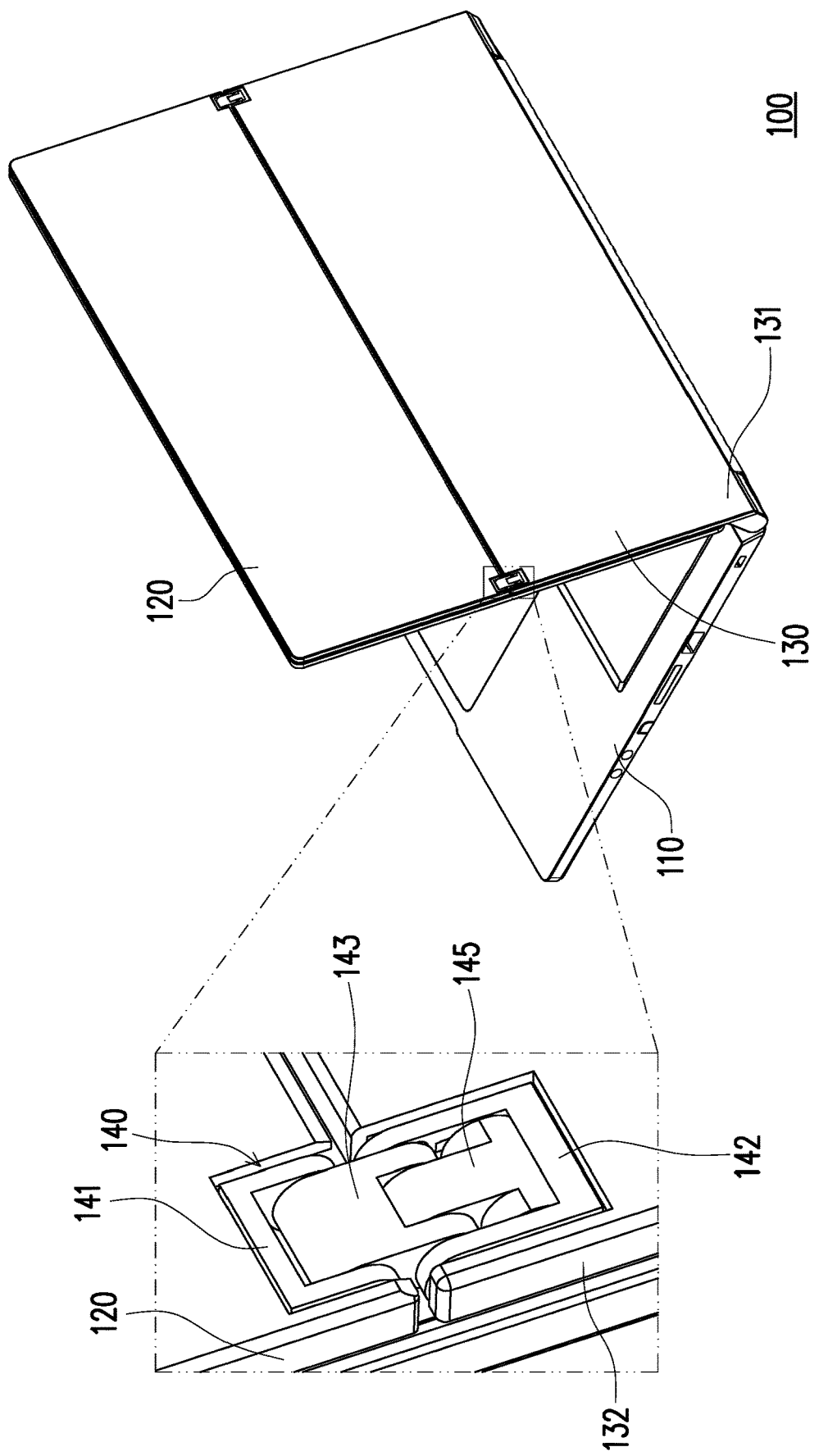
FIG. 1A is a schematic diagram of a portable electronic device in a first state according to an embodiment of the present application.
Figure 1B:
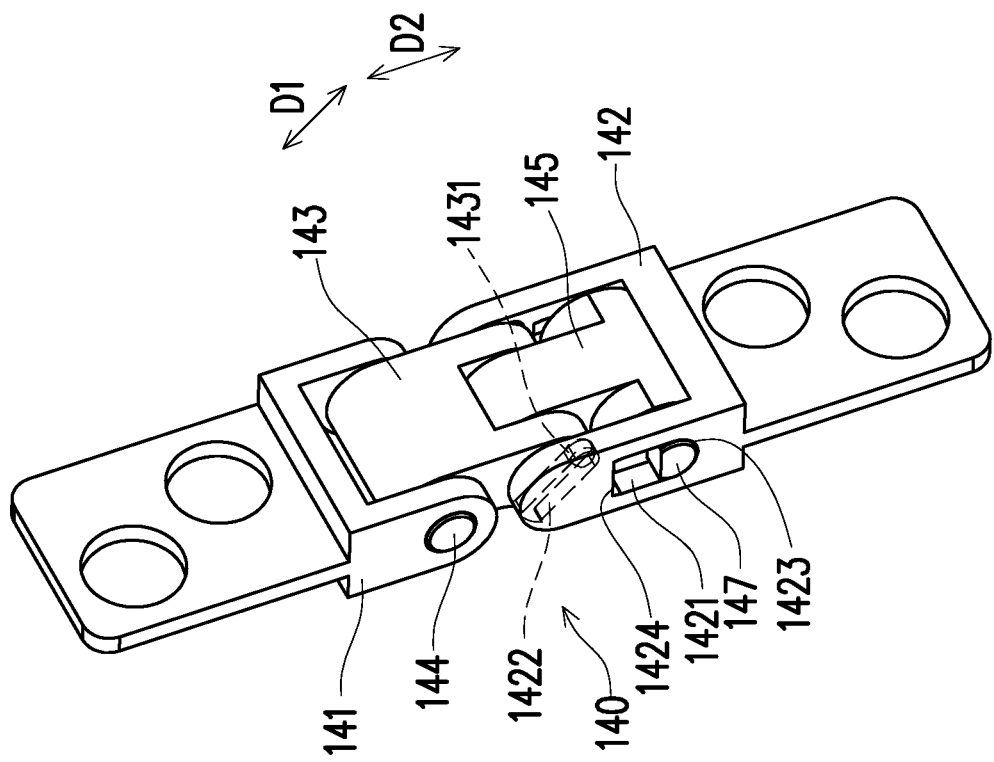
FIG. 1B is a schematic diagram of the hinge structure of FIG. 1A.

FIG. 1A is a schematic diagram of a portable electronic device in a first state according to an embodiment of the present application. FIG. 1B is a schematic diagram of the hinge structure of FIG. 1A. Referring to FIG. 1A and FIG. 1B, in the embodiment, the portable electronic device 100 may be a notebook computer, and includes a first body 110, a second body 120, a stand 130 and a hinge structure 140. The first body 110 may be a host with functions such as logic operation and data access, and the second body 120 may be a display having an image display function. The second body 120 is pivotally connected to the first body 110 through the stand 130, so as to be turned over relative to the first body 110 around two parallel axes in space, thus helping to improve the flexibility in operation.

In detail, the stand 130 has a first pivot part 131 and a second pivot part 132 opposite to the first pivot part 131, wherein the first pivot part 131 is pivotally connected to the first body 110, and the second body 120 is pivotally connected to the second pivot part 132. On the other hand, the hinge structure 140 may be a biaxial hinge structure, and the second body 120 is pivotally connected to the stand 130 through the hinge structure 140.

In the embodiment, the hinge structure 140 includes a first bracket 141, a second bracket 142, a first movable base 143, a first shaft 144, a second movable base 145, a second shaft 146 and a sliding shaft 147, wherein the first bracket 141 is secured to the second body 120, and the second bracket 142 is secured to the second pivot part 132 of the stand 130. The first movable base 143 and the second movable base 145 is arranged between the first bracket 141 and the second bracket 142, wherein the first bracket 141 is pivotally connected to the first movable base 143, and the first movable base 143 is pivotally connected to the second movable base 145. In addition, the second movable base 145 is slidably connected to the second bracket 142.

In detail, the first shaft 144 is secured to the first bracket 141 and is pivotally connected to the first movable base 143.

The second shaft 146 is secured to the first movable base 143 and is pivotally connected to the second movable base 145. That is, the first shaft 144 and the second shaft 146 are respectively arranged on opposite sides of the first movable base 143. The sliding shaft 147 is secured to the second movable base 145 or is a protruding shaft on the second movable base 145, and the second movable base 145 is slidably connected to the second bracket 142 through the sliding shaft 147. On the other hand, the second shaft 146 and the sliding shaft 147 are respectively arranged on opposite sides of the second movable base 145, and the second shaft 146 is arranged between the first shaft 144 and the sliding shaft 147.

Figure 2A:
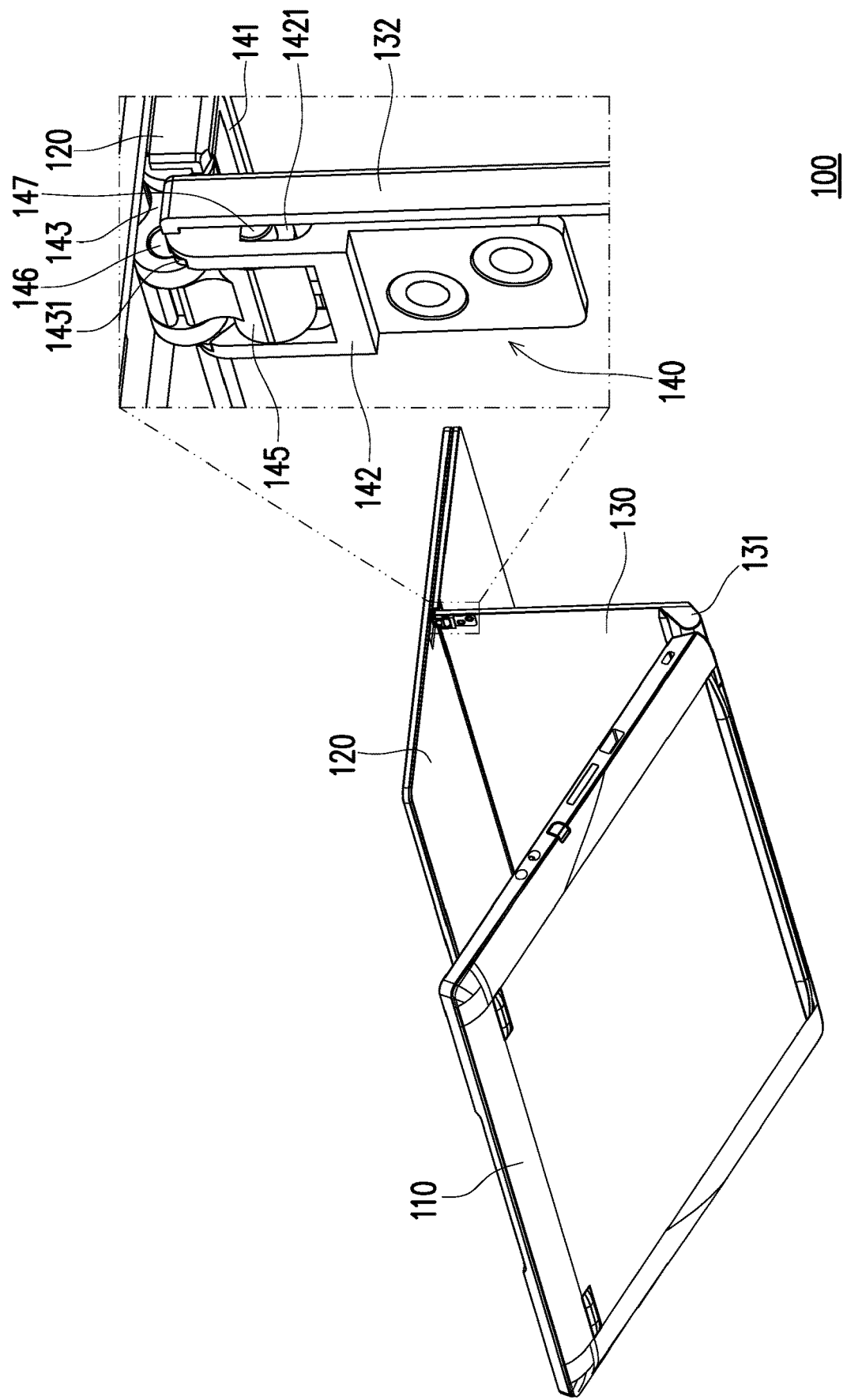
FIG. 2A is a schematic diagram of a portable electronic device transitioning to a second state according to an embodiment of the present application.
Figure 2B:
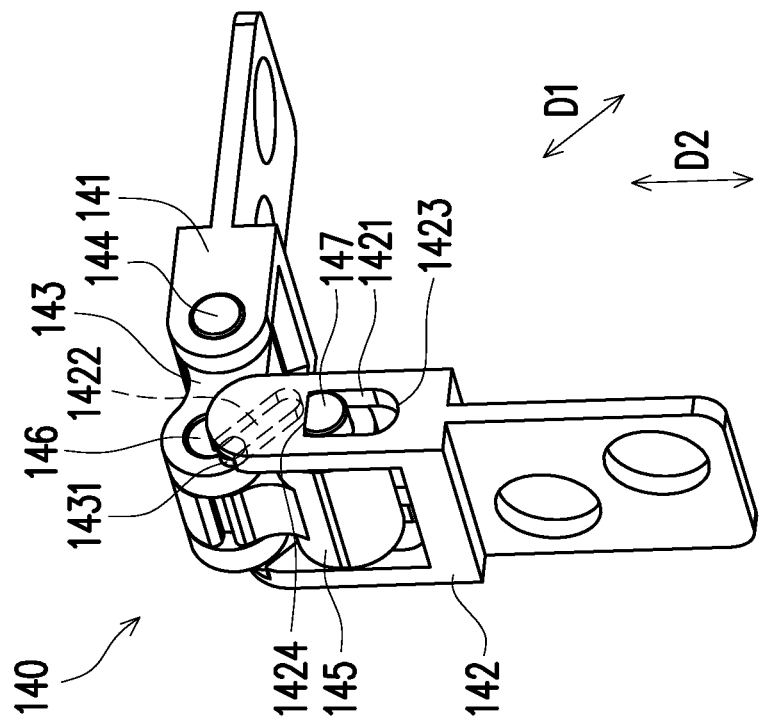
FIG. 2B is a schematic diagram of the hinge structure of FIG. 2A.
Figure 3A:
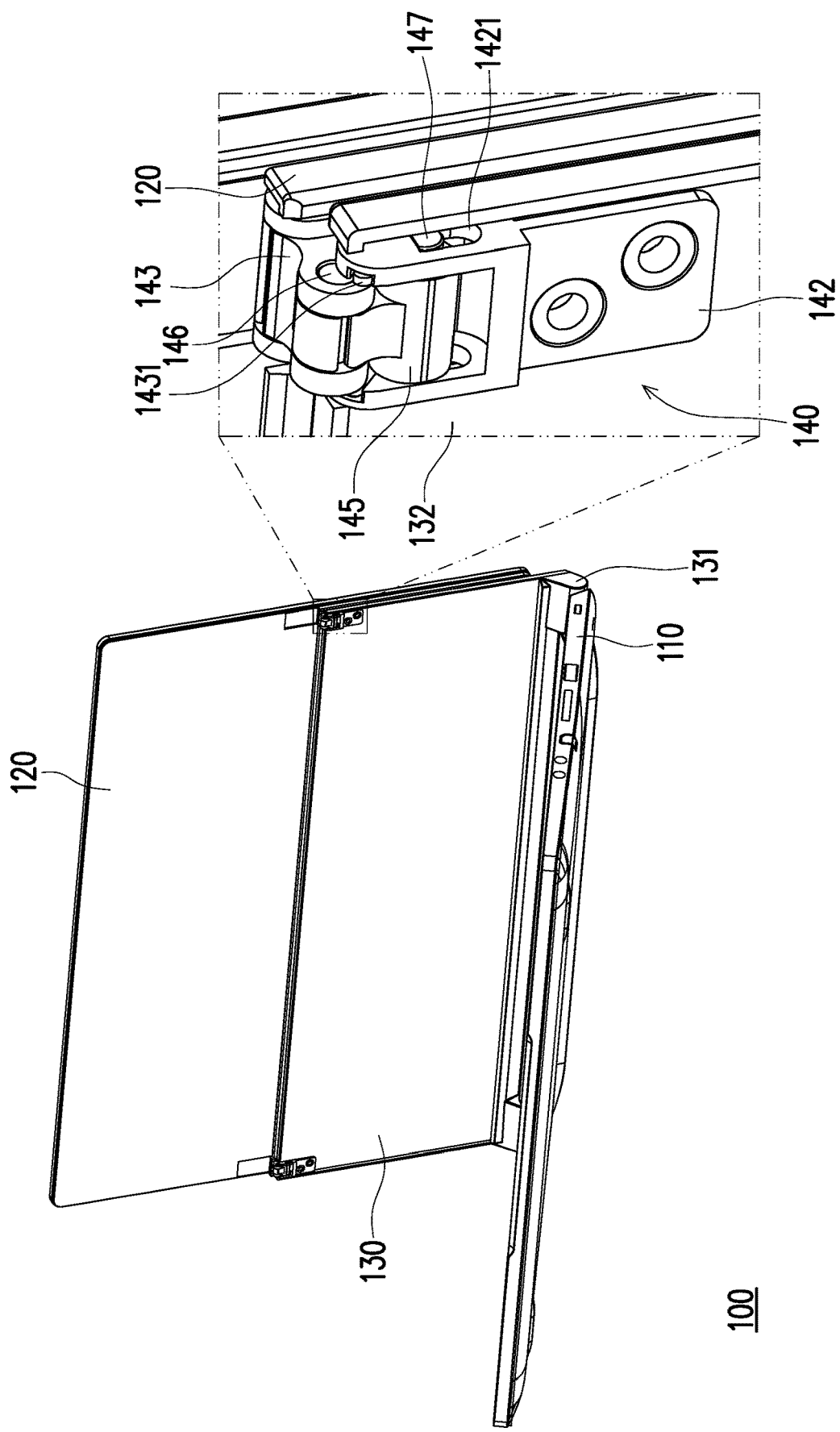
FIG. 3A is a schematic diagram of a portable electronic device transitioning to a third state according to an embodiment of the present application.
Figure 3B:
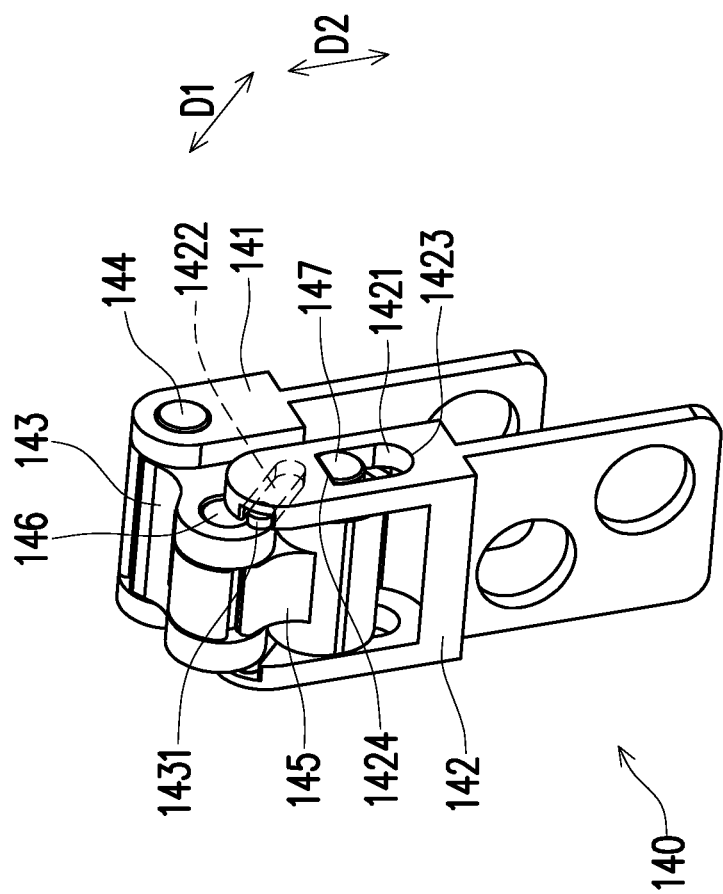
FIG. 3B is a schematic diagram of the hinge structure of FIG. 3A.

FIG. 2A is a schematic diagram of a portable electronic device transitioning to a second state according to an embodiment of the present application. FIG. 2B is a schematic diagram of the hinge structure of FIG. 2A. FIG. 3A is a schematic diagram of a portable electronic device transitioning to a third state according to an embodiment of the present application. FIG. 3B is a schematic diagram of the hinge structure of FIG. 3A. As shown in FIG. 1A to FIG. 2B, in the embodiment, a torsion of the first shaft 144 is greater than a torsion of the second shaft 146. Further, when the first movable base 143 is turned over relative to the second movable base 145 through the second shaft 146, a first torsion is generated between the second shaft 146 and the second movable base 145. On the other hand, when the first bracket 141 is turned over relative to the first movable base 143 through the first shaft 144, a second torsion greater than the first torsion is generated between the first shaft 144 and the first movable base 143.

Due to the torsion of the first shaft 144 is greater than the torsion of the second shaft 146, during the process of turning over the second body 120 relative to the stand 130, the second body 120 is first turned over by a first angle (for example, 90 degrees) relative to the stand 130 through the second shaft 146. After the second body 120 is turned over by a first angle (for example, 90 degrees) relative to the stand 130 through the second shaft 146, the turning freedom of the second shaft 146 relative to the second movable base 145 is restricted. That is, the second shaft 146 cannot turn over relative to the second movable base 145 at this time. Then, the second body 120 is turned over through a second angle (for example, 90 degrees) relative to the stand 130 through the first shaft 144, as shown in FIG. 2A to FIG. 3B. Further, the angle range of the second body 120 that can be flipped is 0 degrees to 180 degrees, the maximum flip angle is the sum of the first angle (for example, 90 degrees) and the second angle (for example, 90 degrees).

Continuing from the above, the second body 120 can be turned over relative to the stand 130 through the second shaft 146 and the first shaft 144 in sequence, so as to increase the range of the angle that can be turned over, thereby improving the flexibility in operation. On the other hand, when the second body 120 is turned over relative to the stand 130 through the second shaft 146, the second body 120 can slide relative to the stand 130. Thereby, the smoothness of the second body 120 is improved when it is turned over, and the collision with the stand 130 is avoided when the second body 120 is turned over.

As shown in FIG. 1B, FIG. 2B and FIG. 3B, the first movable base 143 has a sliding protrusion part 1431 arranged around the second shaft 146, and the sliding protrusion part 1431 is slidably connected to the second bracket 142. More specifically, the sliding protrusion part 1431 is suitable for sliding along a sliding direction D1 on the second bracket 142, and the sliding shaft 147 is suitable for sliding along a sliding direction D2 which is not parallel to the sliding direction D1 on the second bracket 142.

As shown in FIG. 1A to FIG. 2B, when the second body 120 is turned over relative to the stand 130, because the torsion of the first shaft 144 is greater than the torsion of the second shaft 146, the first bracket 141 and the first movable base 143 are first turned over relative to the second movable base 145 and the second bracket 142 through the second shaft 146. At the same time, the sliding protrusion part 1431 slides on the second bracket 142 along the sliding direction D1 and drives the second movable base 145 to slide relative to the second bracket 142 along the sliding direction D2, so as to drive the second body 120 to slide relative to the stand 130 through the first movable base 143 and the first bracket 141. In detail, the sliding shaft 147 may be used to determine the sliding direction of the second movable base 145, and the sliding protrusion part 1431 slides synchronously with the sliding shaft 147.

Continuing from the above, when the sliding shaft 147 cannot continue to slide, the first bracket 141 and the first movable base 143 have been turned over by a first angle (for example, 90 degrees) relative to the second movable base 145 and the second bracket 142. Likewise, the second body 120 has been turned over by a first angle (for example, 90 degrees) relative to the stand 130.

In the case where the sliding shaft 147 cannot continue to slide, the first movable base 143 and the second movable base 145 remain stationary. The second body 120 is continuously turned over relative to the stand 130, and the first bracket 141 is turned over by a second angle (for example, 90 degrees) relative to the first movable base 143 through the first shaft 144, as shown in FIG. 2A to FIG. 3B. At this time, the flip angle of the second body 120 relative to the stand 130 is 180 degrees, which is the sum of the first angle (for example, 90 degrees) and the second angle (for example, 90 degrees).

As shown in FIG. 1B, FIG. 2B and FIG. 3B, in the embodiment, the second bracket 142 has a sliding slot 1421 and a guide slot 1422 arranged on one side of the sliding slot 1421, wherein the sliding shaft 147 is slidably arranged in the sliding slot 1421, and the sliding protrusion part 1431 is slidably arranged in the sliding slot 1422. In detail, the sliding slot 1421 and the guide slot 1422 are used to determine the sliding direction of the sliding shaft 147 and the sliding protrusion portion 1431, and the sliding slot 1421 is not parallel to the guide slot 1422. On the other hand, the sliding slot 1421 has a first route end 1423 and a second route end 1424, wherein the second route end 1424 is arranged between the second shaft 146 and the first route end 1423, and is arranged between the guide slot 1422 and the first route end 1423. That is, the sliding slot 1421 extends toward the second shaft 146 and the guide slot 1422.

When the first bracket 141 and the first movable base 143 are turned over relative to the second movable base 145 and the second bracket 142 through the second shaft 146, the sliding protrusion part 1431 slides on the second bracket 142 along the sliding direction D1 and drives the sliding shaft 147 to slide on the second bracket 142 along the sliding direction D2. Thereby, the sliding shaft 147 slides from the first route end 1423 to the second route end 1424 or from the second route end 1424 to the first route end 1423 in the sliding slot 1421.

Once the sliding shaft 147 slides to the first route end 1423 and cannot continue to slide in the direction away from the second route end 1424 or slides to the second route end 1424 and cannot continue to slide away from the first route end 1423, then the first movable base 143 and the second movable base 145 remain stationary, and the first bracket 141 can be turned over relative to the first movable base 143 through the first shaft 144.

To sum up, in the portable electronic device of the present application, the second body is pivotally connected to the stand through the biaxial hinge structure, and the torsion of the first shaft is greater than the torsion of the second shaft. Therefore, the second body can be turned over relative to the stand through the first shaft in sequence, so as to increase the range of the angle that can be turned, thereby improving the flexibility in operation. On the other hand, when the second body is turned over relative to the stand through the second shaft, the second body can slide relative to the stand to improve the smoothness of the second body and avoid collision with the stand when the second body is turned over.

Although the present application has been disclosed as above with embodiments, it is not intended to limit the present application, any person with ordinary knowledge in the technical field, without departing from the spirit and scope of the present application, can make some changes. Therefore, the protection scope of the present application shall be determined by the scope of the claims.

What is claimed is:

1. A portable electronic device, comprising:
   a first body;
   a second body;
   a stand, has a first pivot part and a second pivot part opposite to the first pivot part, wherein the first pivot part is pivotally connected to the first body, and the second body is pivotally connected to the second pivot part; and
   a hinge structure, comprising:
      a first bracket, secured to the second body;
      a second bracket, secured to the second pivot part of the stand;
      a first movable base;
      a first shaft, secured to the first bracket and pivoted to the first movable base;
      a second movable base;
      a second shaft, secured to the first movable base and pivoted to the second movable base; and
      a sliding shaft, fixed to the second movable base and slidably connected to the second bracket, wherein the first bracket is rotatable about two parallel axes relative to the second bracket and the two parallel axes respectively passes through the first shaft and the second shaft, wherein the second movable base is unable to rotate with respect to the sliding shaft.

2. The portable electronic device according to claim 1, wherein the second shaft is arranged between the first shaft and the sliding shaft.

3. The portable electronic device according to claim 1, wherein a torsion of the first shaft is greater than a torsion of the second shaft.

4. The portable electronic device according to claim 1, wherein the second bracket has a sliding slot, and the sliding shaft is slidably arranged in the sliding slot.

5. The portable electronic device according to claim 4, wherein the sliding slot extends toward the second shaft.

6. The portable electronic device according to claim 4, wherein the sliding slot has a first route end and a second route end, and the second route end is arranged between the first shaft and the first route end, when the first bracket and the first movable base are turned over relative to the second movable base and the second bracket through the second shaft, the second movable base slides relative to the second bracket and the sliding shaft slides from the first route end to the second route end, then, the first movable base and the second movable base remain stationary, and the first bracket is turned over relative to the first movable base through the first shaft.

7. The portable electronic device according to claim 1, wherein the first movable base has a sliding protrusion part arranged around the second shaft, and the sliding protrusion part is slidably connected to the second bracket, wherein a sliding direction of the sliding protrusion part is not parallel to a sliding direction of the sliding shaft.

8. The portable electronic device according to claim 7, wherein the sliding protrusion slides synchronously with the sliding shaft.

9. The portable electronic device according to claim 7, wherein the second bracket has a sliding slot and a guide slot on one side of the sliding slot, the sliding shaft is slidably arranged in the sliding slot, and the sliding protrusion part is slidably arranged in the sliding slot.

10. The portable electronic device according to claim 9, wherein the sliding slot is not parallel to the guide slot.

11. The portable electronic device according to claim 1, wherein the first shaft is unable to slide with respect to the first bracket.

* * * * *